Patented Nov. 2, 1948

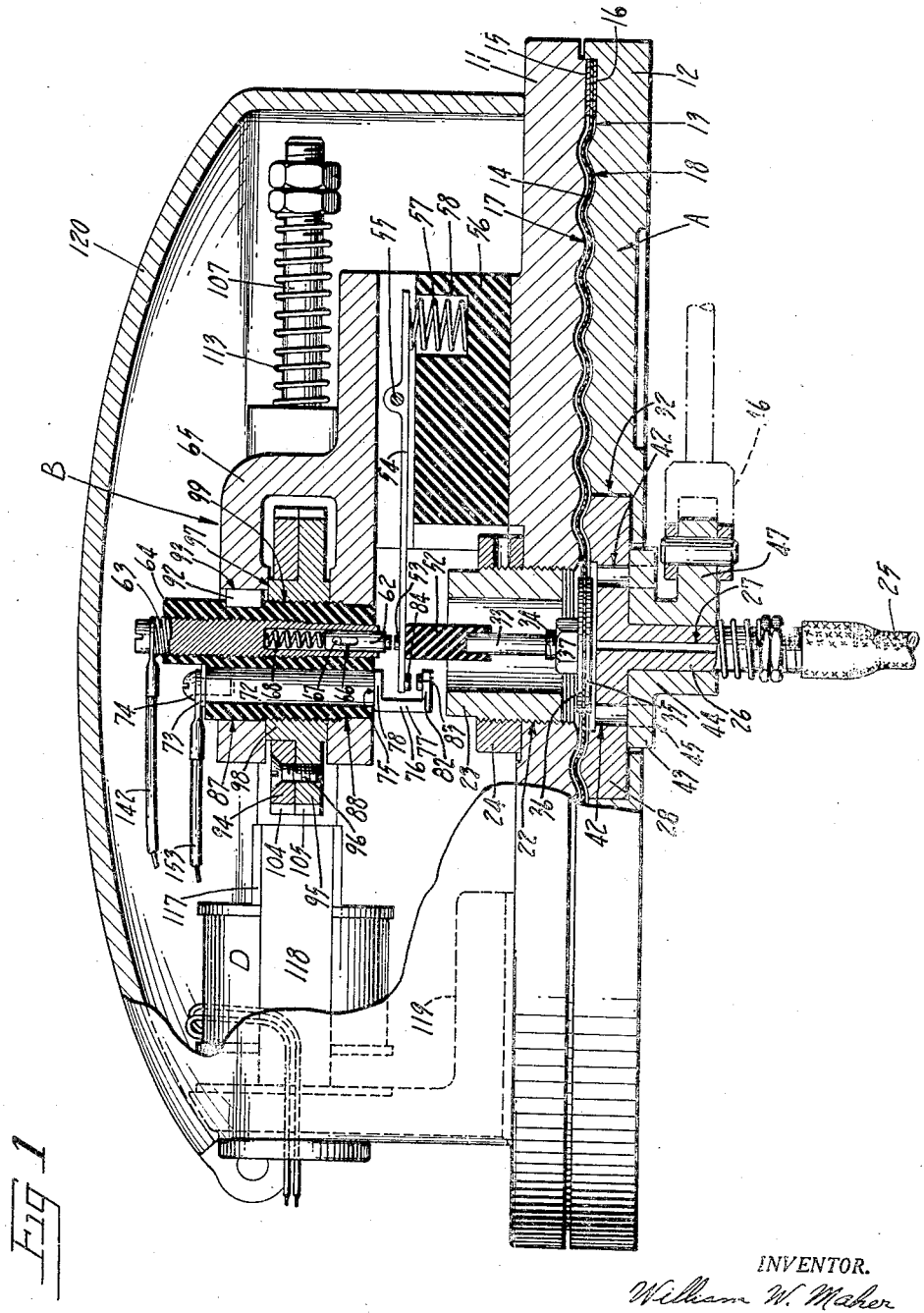

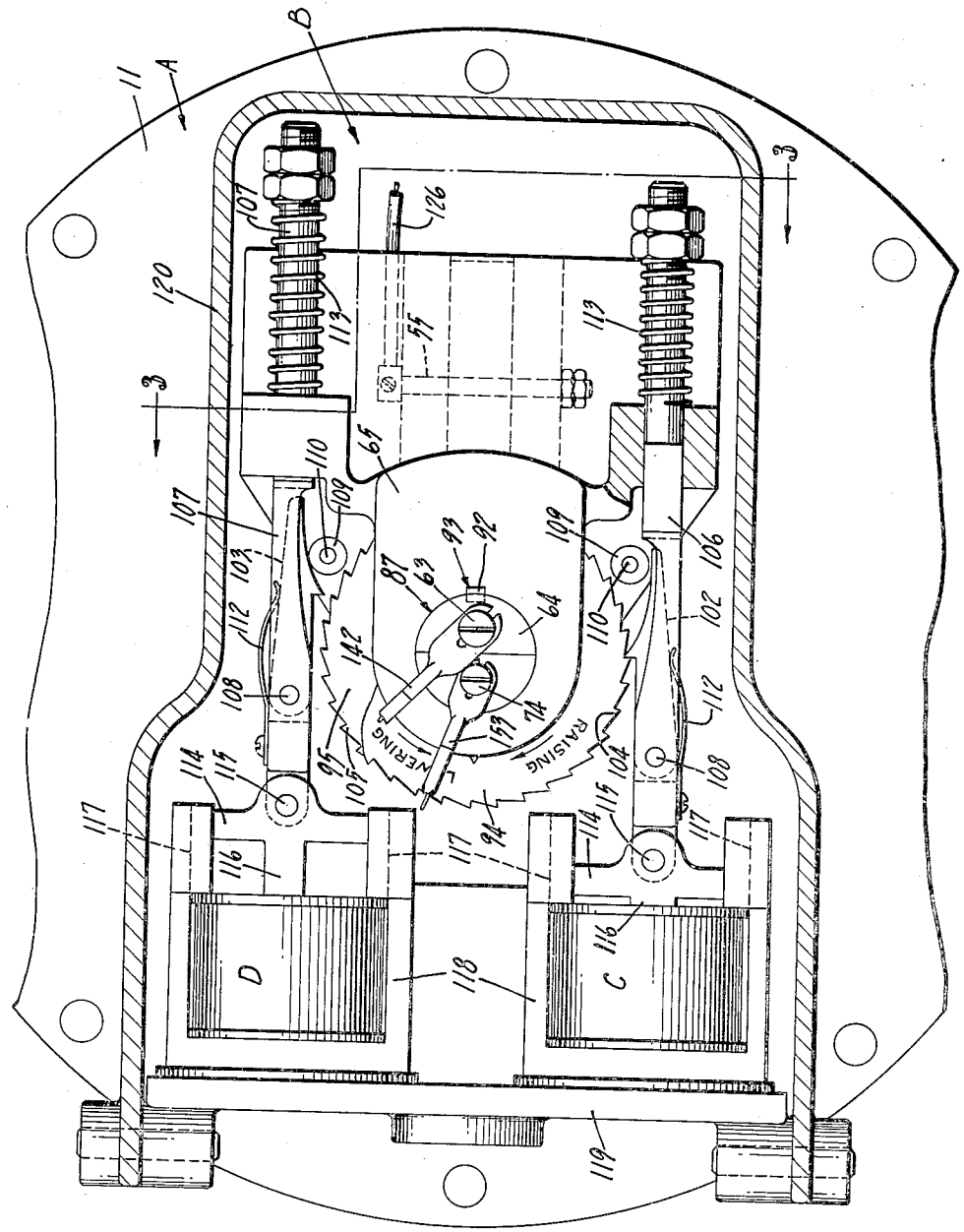

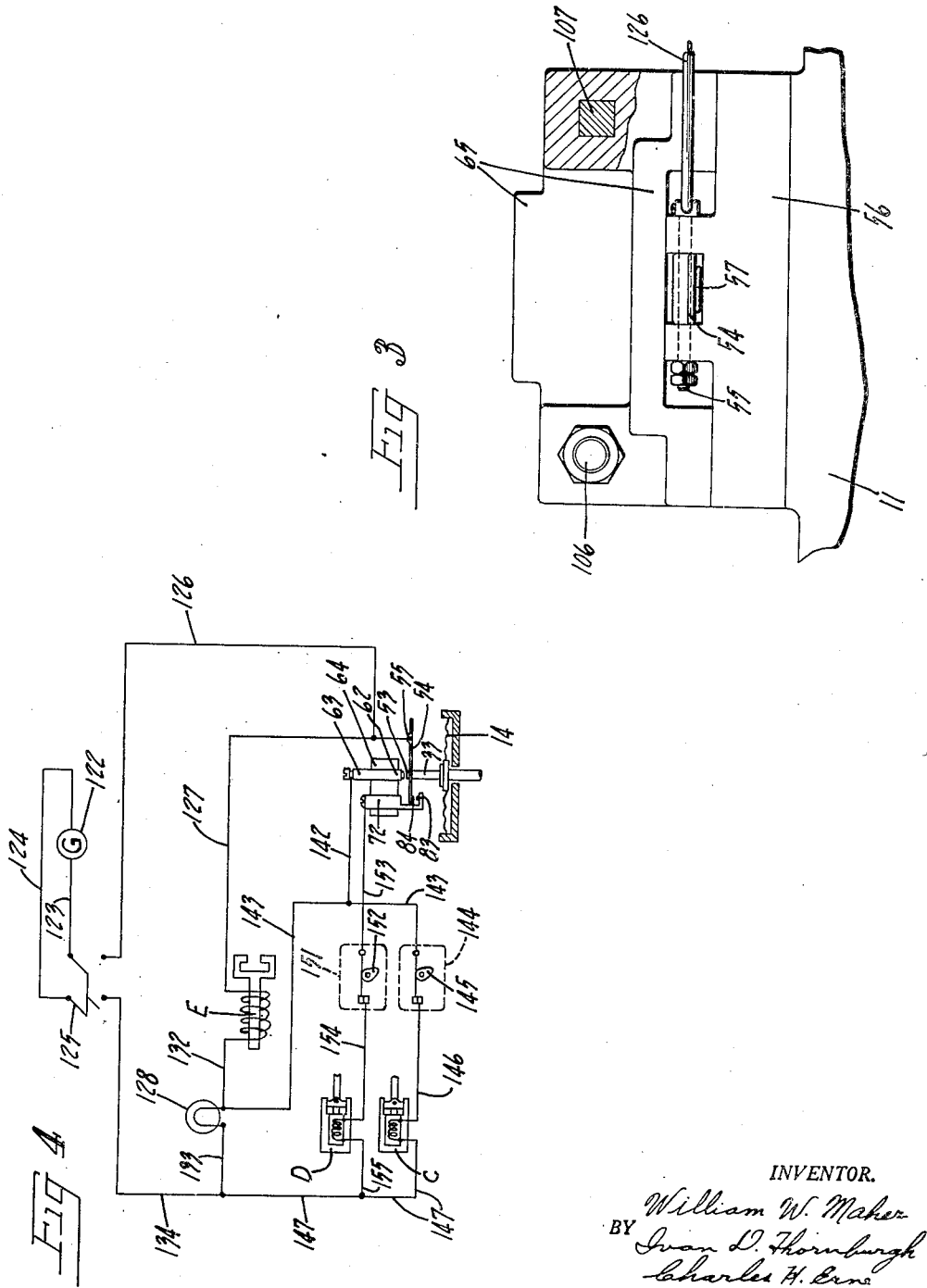

2,452,585

UNITED STATES PATENT OFFICE 2,452,585

RATCHET MOTOR CONTROL MECHANISM

William W. Maher, San Francisco, Calif., assignor to American Can Company, New York, N. Y., a corporation of New Jersey Application April 30, 1946, Serial No. 666,104

13 Claims. (Cl. 318—21)

This invention relates to a control mechanism for can testers and has particular reference to the automatic resetting of electric contact heads between can tests for more accurately detecting leaks in cans.

In my United States Patent 2,232,711, issued February 25, 1941, there is set forth a construction of can testing machine which may be taken as typical and to which the present invention may be applied. In such machines leaky cans are detected by air pressure differences between the interior of the leaky can being tested and a surrounding testing chamber.

The pressure within the testing chamber is set at atmospheric pressure for each testing operation while the interior of the can is subjected to a pressure in excess of atmospheric. Escape of air from the interior of a leaky can into the testing chamber will tend to build up the chamber pressure which will instantaneously effect movement of a diaphragm in the detecting unit. Diaphragm movement alters certain electrically actuated relay devices and leaky cans thus detected thereafter are ejected from the machine while perfect cans are transferred to another or normal delivery outlet.

During the continual operation of the type of can tester just described, it is known that the diaphragm itself does not always return to the same neutral position between can tests but gradually assumes either a higher or a lower position. This is due possibly to temperature changes or to the air pressure from leaky cans or from empty test chambers pumping air against the sensitive diaphragm. While this change in position may not be very great it is sufficient, if accurate testing is desired, to necessitate resetting of the stationary electric contact head to compensate for any such change.

The instant invention contemplates overcoming these difficulties by providing a compensating device or control mechanism which will automatically compensate for any diaphragm change by raising or by lowering the stationary electric contact head thus establishing a new neutral position in accordance with the return position of the diaphragm and this compensation preferably takes place between can tests.

An object of the invention is the provision in detector units of can testing machines, of a control mechanism for resetting a stationary electric contact head between can tests for more accurately detecting leaks in cans.

Another object of the invention is the provision, in a machine of the character described, of a control mechanism for automatically resetting an upper stationary electric contact head and a stationary contact element between can tests by raising or lowering them with respect to a new neutral or assumed position that the diaphragm returns to following a previous test.

Numerous other objects and advantages of the invention will be apparent as it is better understood from the following description, which, taken in connection with the accompanying drawings, discloses a preferred embodiment thereof.

Referring to the drawings:

Figure 1 is a vertical sectional view of a detector unit provided with a control mechanism embodying the present invention, with parts being broken away;

Fig. 2 is a top plan view of the mechanism shown in Fig. 1 with parts broken away and with parts in section;

Fig. 3 is an end view of the mechanism shown in Figs. 1 and 2 taken substantially along the broken lines 3—3 in Fig. 2, the view being rotated through 90 degrees; and Fig. 4 is a wiring diagram of a control circuit included in the detector unit.

As a preferred embodiment of the instant invention, the drawings illustrate the principal parts of a detector unit A, which is similar to the form used with the can testers hereinbefore referred to. An automatic raising and lowering compensating control mechanism B has been added to or combined with the unit A which allows for a more accurate setting of the contact heads. This results in a considerably finer leak detection, which consequently improves the overall testing efficiency of such can testing machines.

The detecting unit A includes an upper disc housing 11 and a lower disc housing 12. These disc housings inclose a space 13 within which a centrally disposed diaphragm 14 is held in flexible position. The periphery of the diaphragm is clamped between circular gaskets 15, 16 interposed between the disc housings 11, 12 and these housings are connected in a hermetically sealed joint being secured by bolts or the like. This construction provides an upper detector chamber 17 and a lower detector chamber 18 located on opposite sides of the diaphragm (Fig. 1) in the space 13.

The upper detector chamber 17 is always at atmospheric pressure, the upper disc housing 11 being open at the top. A threaded opening 22 is formed centrally in the housing 11 in which a tubular member 23 is secured by a nut 24. Tubular member 23 serves as a stop for the upward movement of the diaphragm 14.

The detector unit A is connected to the testing machine by a flexible tube 25, leading from the can testing chamber to a stem 26 (Fig. 1). This stem has an opening 27 through which air under pressure passes from a leaky can in the testing chamber into the lower detector chamber 18.

The stem 26 is formed as an integral part of a flange 28 and provides a stationary valve for the unit. Flange 28 is disposed in a close fitting recess in the lower disc housing 12 and forms a hermetic seal.

A connection is made periodically between the testing chamber, in which the can under test is located, and the lower detector chamber 18 as hereinbefore described. This determines the condition of the air pressure in the testing chamber and this will vary in accordance with the test on certain cans. In the case of a good can, the air in both the upper chamber 17 and the lower chamber 18 will be at atmospheric pressure. Such an air condition will result in a neutral assumed or normal position of the diaphragm 14 which at the beginning of the testing period is halfway between the housing walls, as shown in Fig. 1.

An augmented air pressure coming from a testing chamber of a leaky can, therefore, will be at a greater pressure than atmospheric pressure. Under such an augmented pressure condition the diaphragm will be raised above its neutral position. The flexing diaphragm thereupon lifts a centrally disposed vertical pin 33. This effects the operation of the control mechanism B and will be described fully hereinafter.

The pin 33 extends upwardly from a threaded hub 34 which is mounted in a lower washer 35. The hub 34 extends up through central openings in the diaphragm and into an upper washer 36. These washers are clamped on opposite sides of the diaphragm and are secured as a unit by a nut 37, in a hermetic seal in the center of the diaphragm.

Provision is made for venting the lower detecting chamber 18 following each can test. This maintains the normal atmospheric pressure in this chamber, restoring it to atmospheric if the preceding test has increased it. The pin 33 with the diaphragm 14 then will return to a neutral position ready for the next can test.

A plurality of vent openings 42 are formed in the flange 28 of the stem 26 for venting the chamber 18. These openings are sealed off most of the time by a flange 43 of a rotary release valve 44 carried on the stem 26 and having engagement against the lower face of the flange 28. Openings 45 cut in the flange 43 have registration with the openings 42 thus venting the chamber as the valve 44 is rocked about the stem 26. Such valve movement is effected in a suitable manner, as for example by a link connection 46 pivoted on an arm 47 of the valve. Such a connection may be operated from the can tester in proper time with other operations of the machine.

The pin 33 at its upper end carries an insulated head 52 which engages against a movable electrical contact head 53 (Fig. 1). This movable head is secured to the top face of a hinge bar 54 near one end thereof. Hinge bar 54 is pivoted near its opposite end on a bolt 55 secured in an insulating block 56 mounted on the upper disc housing 11 (see also Fig. 3).

The hinge bar 54 is engaged from below at the end beyond its pivot point by a spring 57 which is housed within a bore 58 of the insulating block 56. Spring 57 normally holds the hinge bar 54 in a lowered or neutral position so that its contact head 53 is out of engagement with an upper relatively stationary contact head 62.

The upper contact head 62 is carried in a hollow threaded bolt 63 which is threadedly secured in an adjustable holder 64 of the control mechanism B. This holder is carried in a housing 65 which is mounted on the insulating block 56.

The upper stationary contact head 62 is formed with a slot 66 through which passes a holding pin 67. Pin 67 is carried in the hollow bolt 63. This pin and slot connection permits slight vertical movement of the upper contact head 62 against a spring 68 located in the hollow bolt. The spring 68 presses down on the top of the contact pin and holds it normally in its lowered relatively stationary position, the holding pin forming a stop for such position (Fig. 1).

The adjustable holder 64 also carries a stud 72. Stud 72 is secured in position by a washer 73 and a screw 74 at its upper end and by a shoulder 75 of an enlarged lower end 76. The lower end is slotted along one side to form a vertical wall 77 and spaced upper and lower horizontal walls 78, 82, the space between these walls permitting the free entry of the end of the hinge bar 54.

The upper face of the lower horizontal wall 82 carries a stationary contact element 83. Contact element 83 coacts with a contact element 84 secured to the lower face of the hinge bar 54 (Fig. 1). Contact elements 83, 84 normally are spaced apart and only come into contact when element 83 is moved up during a control movement or when the diaphragm fails to fully return into its former position following a can test. This will be described more fully hereinafter.

The adjustable holder 64 is a cylindrical member located in vertically disposed openings 87, 88 in the housing 65 (Figs. 1 and 2). Such a holder preferably is formed of non-conducting material thus insulating both the bolt 63 and the stud 72 from the supporting parts of the machine. The holder 64 carries a feather 92 which extends into a featherway 93 of the housing 65. This confines the holder 64 against rotation in its support but does not interfere with vertical movement for resetting the upper and lower contact members 62, 83.

The holder 64 is adjusted vertically by an upper ratchet wheel 94 and a lower ratchet wheel 95 (Figs 1 and 2). These wheels are secured together by screws 96 and are disposed in a slot 97 cut out along one side of the housing 65. Lower ratchet wheel 95 is formed with an internal threaded hub 98 which engages with an intermediate threaded section 99 formed on the outer periphery of the adjustable holder 64. Thus, as the ratchet wheels 94, 95 have rotative movement on their common vertical axis, the adjustable holder 64 is moved up or down to reset the upper contact head 62 and the contact element 83 in a revised neutral position for a subsequent can test. This compensates for any failure of the diaphragm to return to its former neutral position.

The ratchet wheels 94, 95 have but a partial rotation to effect the resetting of the contact members. For this purpose pawls 102, 103 are provided (Fig. 2). Pawl 102 engages with ratchet teeth 104 on the upper ratchet wheel 94. In like manner pawl 103 engages with ratchet teeth 105 on the lower ratchet wheel 95.

The pawls 102, 103 are carried in slots cut in pawl rods 106, 107. These pawls are pivoted on pins 108 and are held inwardly against rollers 109 and/or the respective ratchets by leaf springs 112. Each of the pawls rest against a roller 109 when out of engagement with their respective ratchets as when drawn to the right as viewed in Fig. 2. Rollers 109 are carried on pins 110 secured in housing 65.

Pawl rods 106, 107 are held normally toward the right by individual springs 113 as is illustrated and these springs surround the rods at their right ends (Fig. 2). The pawl rods 106, 107 are pivoted at their opposite ends in cross heads 114 by means of pins 115. Each cross head forms a part of a core 116 of a solenoid. The two solenoids are indicated by the letters C and D.

The cross heads 114 are movable in slides 117 formed in the legs of U-shaped frames 118. There are two such frames, each of the frames encircling and carrying its solenoid these being the solenoids C and D. The frames 118 are secured at their bases to a bracket 119 which is mounted on the upper disc housing 11. A cover 120 hinged to the bracket 119 houses the mechanism B.

For a description of the testing of cans, reference will now be had to the wiring diagram of Fig. 4. Such a diagram illustrates the electrical parts for controlling the mechanism hereinbefore described which is used in connection with the necessary relays, etc., required for segregation of good and of leaky cans, as more fully described in my aforementioned patent.

Electrical energy for operation of the can tester may proceed from a generator 122 disposed in a circuit utilizing lead wires 123 and 124. A service switch 125 connected in the lead wires is closed for testing of cans and for the detection of leaky cans. Such a switch also makes effective the control mechanism or diaphragm compensating devices of the present invention.

So long as cans are good, air remains locked in them while they are undergoing the test. Therefore air does not pass into the lower detector chamber 18 to alter the atmospheric pressure therein. The diaphragm 14 with its pin 33 thus remains in neutral position and there is a space between the contact heads and a space between the contact elements. Under this condition there is no actuation of the leaky can discharge relays, etc., and no actuation of any compensating or control mechanism. A solenoid E of a reject delay mechanism remains energized and the cans are delivered to the good can discharge runway. Solenoid E preferably is the same kind and functions in the same manner as the solenoid of the time control and track actuation mechanism explained in detail in my patent hereinbefore mentioned and reference may be had thereto for a more detailed description of operation.

For this energizing of the solenoid E electrical energy flowing from the generator 122 along the lead wire 123 passes through one side of the closed service switch 125 and through a wire 126 to the hinge bolt 55 connected with the diaphragm unit (see also Fig. 3). A wire 127 connected with the wire 126 extends to one side of solenoid E. The opposite side of the solenoid is connected to lamp 128 by a wire 132. A wire 133 connects the lamp 128 to a wire 134 which leads to the opposite side of the service switch 125, the current then passing to the return wire 124 and back to the generator, thus completing the circuit. The resistance of the solenoid coil is such as to permit only a relatively dim illumination of the lamp 128 in the solenoid tester circuit just described.

When a leaky can comes into a test chamber, air leaking from the can during the test period passes into the lower detector chamber 18. This builds up a pressure in the chamber greater than the atmosphere. This increased pressure lifts the diaphragm 14 and with it the pin 33 and hinge bar 54. The contact heads 53, 62 coming together close the detector circuit which short circuits the solenoid E and the solenoid thereupon is deenergized. Since this leaky can detector circuit does not have the solenoid resistance of the solenoid coil, the lamp 128 burns brightly thus giving visual indication of the presence of a leaky can. Such a can is ejected automatically and passes into a faulty can discharge runway, as full described in my Patent 2,232,711 previously mentioned.

Tracing the detector or can tester circuit for a leaky can (Fig. 4) electrical energy flows from the generator 122 along the lead wire 123 to one side of the service switch 125 along the wire 126 to the hinge bolt 55 (see also Fig. 3). The current passing through the hinge bar 54 flows through the contact heads 53, 62 (see also Fig. 1) thence through bolt 63 to a wire 142. Wire 142 is connected to a wire 143 which leads the current into the wire 132 thence through the lamp 128, wires 133, 134, switch 125 and return wire 124 to the generator. With this flow of the detector circuit, since the solenoid E is short circuited, the lamp 128 burns brightly thus giving visual indication of this testing condition.

A compensating action for control of position of the electrical contact members relative to the diaphragm 14 will next be considered. This action will be referred to as a resetting of the diaphragm although strictly speaking the contacts and not the diaphragm position is changed as a result of failure of the diaphragm to return to a desired neutral position following each can test.

Should the diaphragm for any reason remain in a raised position so as to keep the control heads 53, 62 in contact, current at a given period will flow into and will energize the solenoid C of a raising compensating device. This will effect raising of the adjustable holder 64 to separate the contact heads through actuation of the pawl rod 106 which in turn rotates the upper ratchet wheel 94. This operation also provides a resetting for what will be termed a new neutral position of the diaphragm.

Mention has been made of a timing period in the energizing of the solenoid C even though the contact heads 53, 62 are in contact. In other words actuation of the pawl rod takes place at an exact time in the can testing cycle. Such timing is accomplished by a cam controlled switch 144 which at all times is under the action of a time cam 145.

Switch 144 is opened momentarily while a can test is being made to avoid any disturbance of the contact heads 53, 62 which otherwise might affect the outcome of such a test. Immediately following each can test, the rotary release valve 44 (Fig. 1) opens to the atmosphere thus equalizing the pressure in the upper and lower detector chambers 17, 18. Simultaneously with this atmospheric balance of the detector chambers the switch 144 closes and if one of the contact members requires raising for a new neutral diaphragm position a compensating current flows in the following manner.

With the contact heads 53, 62 closed and held closed by the non-returning diaphragm 14 the raising compensating current passes from the generator 122 by way of wire 123, switch 125, wire 126 to the hinge bolt 55 and contact head 53. Such a current passing into the upper contact head 62 flows along the wire 142 and wire 143 (it will be noted that wire 143 is a split wire) through the closed switch 144 thence by a wire 146 into the solenoid C. It will also be noticed that this is a shunt circuit which uses the same path as that of the testing circuit already described up as far as the wire 143. From the solenoid C the current passes by wire 147 back to wire 134, switch 125, wire 124 to the opposite side of the generator 122.

This raising compensating current energizes the solenoid C. The effect of this is to pull in on the pawl rod 106 (see Fig. 2) and through its pawl 102 to turn the ratchet wheel 94, preferably a distance of one tooth. This amount of partial rotation of the ratchet wheel lifts the holder 64 and the stud 72 about one thousandth of an inch. Usually this is sufficient to separate the contact head 62 from the contact head 53 to break the raising compensating circuit through the solenoid C.

Should the contact heads 53, 62 remain together, which would mean that the assumed position of the diaphragm was out more than one thousandth of an inch, the raising compensating circuit nevertheless will be broken at the time switch 144. The spring 113 thereupon restores the pawl rod to its non-held position (toward the right in Fig. 2). Following this the next can is tested in its regular time cycle. Since the contact heads 53, 62 are together the can tested will be thrown out as a leaky can even though it is a good can. This condition occurs very seldom and since the can is discarded no harm is done.

Following the test when the raising compensating current again flows through the solenoid C with the closing of the switch 144 the holder 64 is again raised another thousandth of an inch. If necessary this continues until the contact heads are separated the desired amount. After such separation the diaphragm can be said to be in its new neutral position.

Should a diaphragm for any reason fail to assume the desired normal position but should remain in too low a position so as to cause the contact between the contact elements 83, 84 then a lowering compensating circuit is established which lowers the holder 64 and resets or spaces both the contact heads 53, 62 and the contact elements 83, 84. In that case current at a given period will flow into and will energize a solenoid D of the lowering compensating circuit.

This operation provides the required new setting for a neutral position of the diaphragm. Here again energizing of the solenoid D takes place at an exact time in the can testing cycle. Such timing is accomplished by a cam controlled switch 151 which at all times is under the action of a time cam 152.

Switch 151 is opened momentarily while the can test is being made to avoid any disturbance of the contact heads 53, 62 in the same manner as opening of the switch 144 in the raising compensating circuit already described. Simultaneously with the atmospheric balance of the detector chambers by operation of the rotary release valve 44, the switch 151 closes and the lowering compensating current flows as follows.

Electrical energy from the generator 122 passes by way of wire 123, switch 125, wire 126 to the hinge bolt 55 and to the contact element 84 on the hinge bar 54. Such a current passing into the contact element 83 flows through the stud 72 and thence by a wire 153 into the closed switch 151. It will be noticed that this is also a shunt circuit which uses the same path as that of the testing circuit already described as far as the hinge bar 54. From the switch 151 the current passes by a wire 154 through the coils of the solenoid D and thence by a wire 155 to the wire 147, wire 134, service switch 125 and wire 124 back to the generator.

This lowering compensating current energizes the solenoid D and pulls in on the pawl rod 107 (see Fig. 2). The pawl 103 carried by the pawl rod 107 engages the teeth of the lower ratchet wheel 95 and preferably moves this wheel on its axis for a peripheral distance equal to one tooth. This amount of partial rotation effective on the holder 64 lowers the stud 72 and with it the lower contact element 83 about one-thousandth of an inch.

Usually this is sufficient to separate the contact elements 83, 84 and break the lowering compensating circuit through the solenoid D. Deenergizing of the solenoid D allows the spring 113 to again restore the pawl rod 107 to its non-held position (toward the right in Fig. 2). If this one-thousandth inch movement is not sufficient to create the desired neutral position for the diaphragm subsequent closing of the switch 151 by the cam 152 again will create the necessary lowering compensating circuit for further lowering of the stud 72 and the contact members 62, 83 until the desired position is reached.

In this last position of the returned diaphragm it has been suggested that more than one actuation of the lowering compensating circuit may be necessary to withdraw the contact element 83 from the contact element 84. When these elements thus tend to remain together during two or more consecutive testing periods the contact head 53 is abnormally spaced below the contact head 62. The question which naturally might be raised is will a can then being tested be passed as a good can irrespective of whether it was in fact good or leaky. The test will proceed properly since the leaking of a can and the resulting building up of air pressure within the lower detector chamber 18 will be sufficient to lift the diaphragm during the testing of the can sufficiently to make contact between the contact heads 53, 62 to throw out the leaky can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a control mechanism for can testers, the combination of a detector unit including a diaphragm and a movable contact head, an adjustable holder mounted in said unit and axially movable relative to said diaphragm, a stationary contact head supported by said holder and having cooperation with said movable contact head under action of the diaphragm for detecting leaks in cans, and means mounted in said unit and operable on said holder for shifting said holder to reset said stationary contact head to establish a neutral position for said diaphragm.

2. In a control mechanism for can testers, the combination of a detector unit including a diaphragm and a movable contact head, an adjustable holder, a stationary contact head supported by said holder and having cooperation with said movable contact head upon movement of the diaphragm for detecting leaks in cans, and electrical means operable between can tests and in accordance with a changed return position of said diaphragm for shifting said holder to reset said stationary contact head to establish a neutral position for said diaphragm.

3. In a control mechanism for can testers, the combination of a detector unit including a diaphragm and a movable contact head, a threaded non-rotatable adjustable holder mounted in said detector and having axial movement relative to said diaphragm, a stationary contact head supported by said holder and having cooperation with said movable contact head under action of the diaphragm for actuating a testing circuit for detecting leaks in cans, and rotatable means mounted in said detector unit and having threaded connection with said holder for shifting said holder to reset said stationary contact head to establish a neutral position for said diaphragm.

4. In a control mechanism for can testers, the combination of a detector unit including a diaphragm and a movable contact head, an adjustable holder, a stationary contact head supported by said holder and having cooperation with said movable contact head under action of a diaphragm for detecting leaks in cans, a ratchet wheel for adjusting the position of said holder, a pawl for actuating said ratchet wheel, and means operable between can tests for moving said pawl for resetting said stationary contact head in relation to an assumed position of said diaphragm.

5. In a control mechanism for can testers, the combination of a detector unit including a diaphragm and a movable contact head, an adjustable stationary contact head located in alignment with said movable contact head and having cooperation therewith under action of the diaphragm for detecting leaks in cans, a movable contact element movable with said movable contact head, an adjustable stationary contact element movable with said adjustable stationary contact head, and electrical means utilizing said contact heads and said contact elements for shifting the position of said adjustable stationary contact head and said adjustable stationary contact element to reset the same to establish a neutral position for said diaphragm.

6. In a control mechanism for can testers, the combination of a detector unit including a diaphragm and a movable contact head, an adjustable holder, a stationary contact head supported by said holder and having cooperation with said movable contact head under action of the diaphragm for detecting leaks in cans, a ratchet wheel for adjusting the position of said holder, a pawl for actuating said ratchet wheel, and an electrical circuit including a solenoid operable between can tests for moving said pawl for resetting said stationary contact head in relation to an assumed position of said diaphragm.

7. In a control mechanism for can testers, the combination of a detector unit including a diaphragm and a movable contact head, an adjustable stationary contact head spaced from and located in alignment with said movable contact head and having cooperation therewith under action of the diaphragm for detecting leaks in cans, a movable contact element movable with said movable contact head, an adjustable stationary contact element movable with said adjustable stationary contact head and spaced from and located in alignment and having cooperation with said movable contact element, and electrical means electrically connected with said contact heads and said contact elements for shifting the position of said adjustable stationary contact head to change the spacing between it and said movable contact head and for shifting the position of said adjustable stationary contact element to change the spacing between it and said movable contact element to establish a neutral position for said diaphragm.

8. In a control mechanism for can testers, the combination of a detector unit including a diaphragm and a movable contact head, an adjustable holder, a stationary contact head supported by said holder and having cooperation with said movable contact head under action of the diaphragm for detecting leaks in cans, a pair of ratchet wheels for adjusting said holder one for raising and the other for lowering the same, a pawl for actuating each of said ratchet wheels, and an electrical circuit including solenoids operable between can tests for raising or lowering said holder to reset said stationary contact head to establish a neutral position for said diaphragm.

9. In a control mechanism for can testers, the combination of a detector unit including a diaphragm and a movable contact head movable therewith, an adjustable stationary contact head located above and in spaced alignment with said movable contact head and having cooperation therewith under action of the diaphragm for detecting leaks in cans, a movable contact element movable with said movable contact head and with said diaphragm, an adjustable stationary contact element movable with said adjustable stationary contact head and located below and in spaced alignment with said movable contact element, and electrical means electrically connected with said contact heads and said contact elements and including two electrical circuits for shifting the position of said adjustable stationary contact head and said adjustable stationary contact element one circuit being used to increase the space between said contact heads and the other circuit being used to lessen the said space to establish a new neutral position for said diaphragm.

10. In a control mechanism for can testers, the combination of a detector unit including a diaphragm and a movable contact head movable therewith, an adjustable holder, a stationary contact head carried by said holder and having cooperation with said movable contact head under action of the diaphragm for detecting leaks in cans, a movable contact element movable with said movable contact head and with said diaphragm, an adjustable stationary contact element carried by said holder, and electrical means including a holder raising circuit connecting with said contact heads and a holder lowering circuit connecting with said contact elements to change the spacing between said contact heads and between said contact elements to establish a neutral position for said diaphragm.

11. In a control mechanism for can testers, the combination of a detector unit including a diaphragm, a hinge bar and a movable contact head carried by said bar, an adjustable holder, a stationary contact head supported by said holder and having cooperation with said movable contact head under action of the diaphragm for detecting leaks in cans, a movable contact element carried by said hinge bar, a stationary contact element carried by said adjustable holder, and means operable between can tests for shifting said holder to reset the relative positions of said stationary contact heads and of said stationary contact elements in relation to an assumed position of said diaphragm.

12. In a control mechanism for can testers, the combination of a detector unit including a diaphragm, a hinge bar and a movable contact head carried by said bar, an adjustable holder, a stationary contact head supported by said holder and having cooperation with said movable contact head under action of the diaphragm for detecting leaks in cans, a movable contact element carried by said hinge bar, a stationary contact element carried by said adjustable holder, a pair of ratchet wheels for adjusting said holder one for raising and the other for lowering the same, a pawl for actuating each of said ratchet wheels, and an electrical circuit including solenoids operable between can tests for shifting said pawls for adjusting said holder to reset the relative positions of said stationary contact heads and of said stationary contact elements in relation to an assumed position of said diaphragm.

13. In a control mechanism for can testers, the combination of a detector unit including a diaphragm, a hinge bar and a movable contact head carried by said bar, an adjustable holder, a stationary contact head supported by said holder and having cooperation with said movable contact head under action of the diaphragm for detecting leaks in cans, a movable contact element carried by said hinge bar, a stationary contact element carried by said adjustable holder, a housing for carrying said holder, an upper ratchet wheel and a lower ratchet wheel said ratchet wheels surrounding said holder and having threaded engagement therewith for raising and for lowering said holder, a pawl rod located adjacent each of said ratchet wheels, a pawl carried in each of said pawl rods and having engagement with teeth on each of said ratchet wheels, and an electrical circuit including solenoids operable between can tests for shifting a said pawl rod to actuate a said pawl and a said ratchet wheel to reset the position of said stationary contact head and said stationary contact element in relation to an assumed position of said diaphragm.

WILLIAM W. MAHER.

REFERENCES CITED

The following references are of record in the file of this patent:

UNITED STATES PATENTS

| Number | Name | Date |
|---|---|---|
| 2,232,711 | Maher | Feb. 25, 1941 |